United States Patent [19]
White

[11] Patent Number: 5,455,646
[45] Date of Patent: Oct. 3, 1995

[54] STOP-MOTION MECHANISM

[76] Inventor: Wayne E. White, Jr., 21185 Parklane, Farmington Hills, Mich. 48335

[21] Appl. No.: 209,158

[22] Filed: Mar. 10, 1994

[51] Int. Cl.[6] ............................................. F16H 27/04
[52] U.S. Cl. ............................ 353/25; 74/84 R; 33/1 M
[58] Field of Search ............................ 353/26 R, 26 A, 353/27 R, 27 A, 25; 33/1 M; 74/84 R, 89.15, 426, 424.8, 458, 459

[56] References Cited

U.S. PATENT DOCUMENTS

| | | | |
|---|---|---|---|
| 3,302,513 | 2/1967 | Papayannopoulos . | |
| 3,323,373 | 6/1967 | Murray et al. . | |
| 3,563,645 | 2/1971 | Burke et al. | 353/27 |
| 3,655,279 | 4/1972 | Rathfelder | 353/27 |
| 3,661,449 | 5/1972 | Wright . | |
| 3,712,724 | 1/1973 | Courtney-Pratt | 353/38 |
| 3,748,032 | 7/1973 | Kyle et al. | 353/25 |
| 3,864,034 | 2/1975 | Yevick | 353/25 |
| 3,868,179 | 2/1975 | Zeutschel | 353/25 |
| 3,873,194 | 3/1975 | Schwartz | 353/103 |
| 3,942,885 | 3/1976 | Kool | 353/27 R |
| 3,961,846 | 6/1976 | Crew | 353/25 |
| 4,029,406 | 6/1977 | Sickles | 353/27 R |
| 4,049,341 | 9/1977 | Toriumi et al. | 353/27 R |
| 4,074,933 | 2/1978 | Yevick | 353/27 R |
| 4,077,708 | 3/1978 | Freiberg et al. | 353/27 R |
| 4,094,596 | 6/1978 | Waly | 353/27 R |
| 4,121,887 | 10/1978 | Gross | 353/27 R |
| 4,220,404 | 9/1980 | Hofmann et al. | 353/27 R |
| 4,287,564 | 9/1981 | Swift et al. | 364/525 |
| 4,289,396 | 9/1981 | Jastrab | 355/45 |
| 4,515,451 | 5/1985 | Benham, Jr. et al. | 353/27 R |
| 4,529,281 | 7/1985 | DeRoche et al. | 353/27 R |
| 4,638,677 | 1/1987 | Fuke | 74/84 R |
| 4,688,440 | 8/1987 | Okita | 74/84 R |
| 4,704,019 | 11/1987 | Yamamoto | 353/27 R |
| 4,710,691 | 12/1987 | Bergstrom et al. | 318/696 |
| 4,830,484 | 5/1989 | Yamamoto et al. | 353/25 |
| 5,140,374 | 8/1992 | Jagielski et al. | 355/271 |

Primary Examiner—William A. Cuchlinski, Jr.
Assistant Examiner—William C. Dowling
Attorney, Agent, or Firm—Harness, Dickey & Pierce

[57] ABSTRACT

A stop-motion mechanism utilizes rotational means for rotating a shaft having a thread with an alternating series of helical portions and arc portions. A follower is mounted for motion having a longitudinal component, and is adapted to engage the thread formed on the rotatable shaft. When the shaft is rotated, the follower thus moves in an intermittent fashion which is characterized by alternating periods of motion having a longitudinal component and pauses in motion.

20 Claims, 4 Drawing Sheets

STOP-MOTION MECHANISM

BACKGROUND OF THE INVENTION

1. Technical Field

The invention relates generally to stop-motion mechanisms, and more particularly a stop-motion mechanism incorporating a threaded rotatable shaft and a follower for engaging the thread on the shaft.

2. Discussion

Visual projectors of various types project an image imprinted upon a transparent film onto a viewing screen, such as microfiche readers and reel-to-reel microfilm readers. The film, whether microfiche or microfilm, is generally arranged having a series of adjacent frames, each frame having the same rectangular size. A microfiche film generally has a two-dimensional array of frames in an adjacent grid format. A reel of microfilm generally holds a long strip of having only one frame across its width, and the frames are arranged end to end. Microfiche films are generally imprinted with a series of images which are arranged in rectangular frames in a two-dimensional array, in which each frame is of the same size and is aligned adjacent to the surrounding frames. Each frame on either type of film is usually imprinted with one of a series of consecutive images, such as pages from a book, periodical, newspaper, catalog, or patent. In addition, films are often provided with indexing holes arranged in preselected positions for being engaged by indexing projections, posts, or gears provided on the projector, so that the film will always be loaded in the same position relative to the projection apparatus. As a result, the film is preferably aligned so that each frame may be located by an operator of the visual projector, and that each frame will be aligned with respect to the viewing screen.

The visual projector, whether of microfiche or microfilm, is generally adapted to show one frame at a time. Each projector is generally arranged to have a constant magnification, except that some projectors allow the lens to be removed and replaced. In other words, the projector cannot zoom in on a particular area or view more than one frame at a time, without physically changing the lens.

Such visual projectors utilize various mechanisms for moving the transparent film relative to the projection apparatus, so that the desired portion of the film will be projected onto the screen. Microfiche readers generally provide a film carrier constructed of a transparent and clear platen and cover. A rectangular sheet of film is placed between the platen and the cover, and the carrier can be manually moved by manipulating an arm which is rigidly affixed to the carrier. The carrier is generally free to move horizontally in two perpendicular dimensions with respect to a projection lens, so that any particular portion of the film may be viewed.

In contrast, microfilm projectors utilize a reel-to-reel driving system, in which two reels are driven by motors so that the operator may move the film forward or backward, while the projection apparatus displays a portion of the film having the same size as one of the frames imprinted thereon.

The various mechanisms for moving the transparent film in a visual projector are thus generally of two types: manual and motor-driven. In a manual mechanism, the operator merely moves by hand a pointer which is rigidly affixed to a carrier which holds the film. In a motor-driven mechanism, such as in a reel-to-reel microfilm projector, the operator can run the film either forward or backwards, at a desired speed among a range thereof. In general, existing methods for moving the transparent film used in visual projectors are generally capable of moving that film only in a generally continuous manner. As a result, the images and frames shown on the viewing screen generally move rapidly past the projecting apparatus as the film is moved to shown another portion thereof, presenting an incomprehensible blur on the viewing screen.

Accordingly, it is desirable to provide a mechanism for moving a transparent film for use in a visual projector in an intermittent stop-motion fashion, whereby the film will pause momentarily to show an individual frame, move the film to another frame, and then pause to project that frame momentarily. The frames would appear to be stationary while the images would appear to be animated, because of the optical effect of image holding, rather than simply moving or whizzing past on the screen, with the frames appearing to blur in motion.

SUMMARY OF THE INVENTION

Accordingly, the present invention provides a novel stop motion mechanism for use with a visual projector, incorporating a rotatable shaft having a thread describing a curve on a surface of the shaft, in which the curve has an alternating series of helical portions and arc .portions describing an arc about an axis of the shaft, and a follower mounted to engage the thread on the shaft. When the shaft is rotated, the follower moves in an intermittent manner characterized by alternating periods in which the follower moves in a direction having a longitudinal component and in which the follower remains stationary.

These and other various advantages and features of the present invention will become apparent from the following description and claims, in conjunction with the appended drawings.

DETAILED DESCRIPTION OF THE PREFERRED EMBODIMENTS

The following description of the preferred embodiments is merely exemplary in nature, and is in no way intended to limit the invention, or its application or uses.

Figure 1:
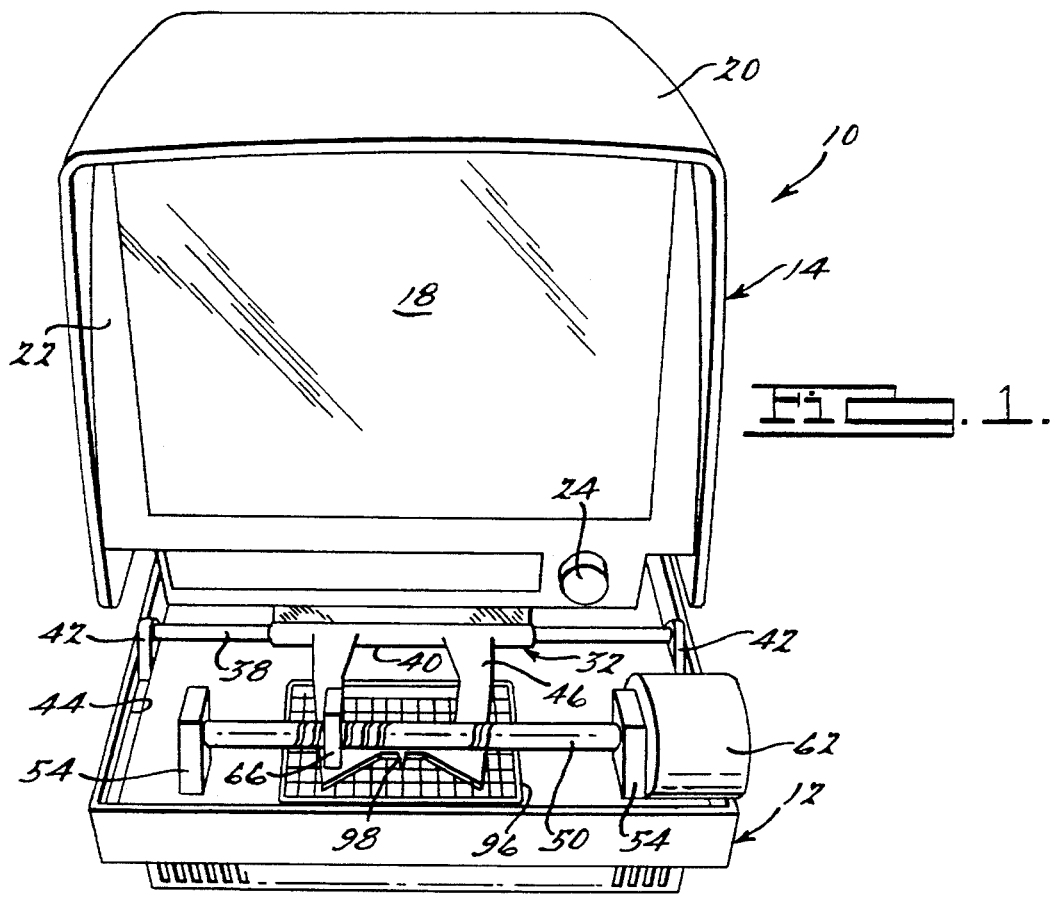
FIG. 1 is a perspective view of a visual projector according to the principles of the present invention.
Figure 2:
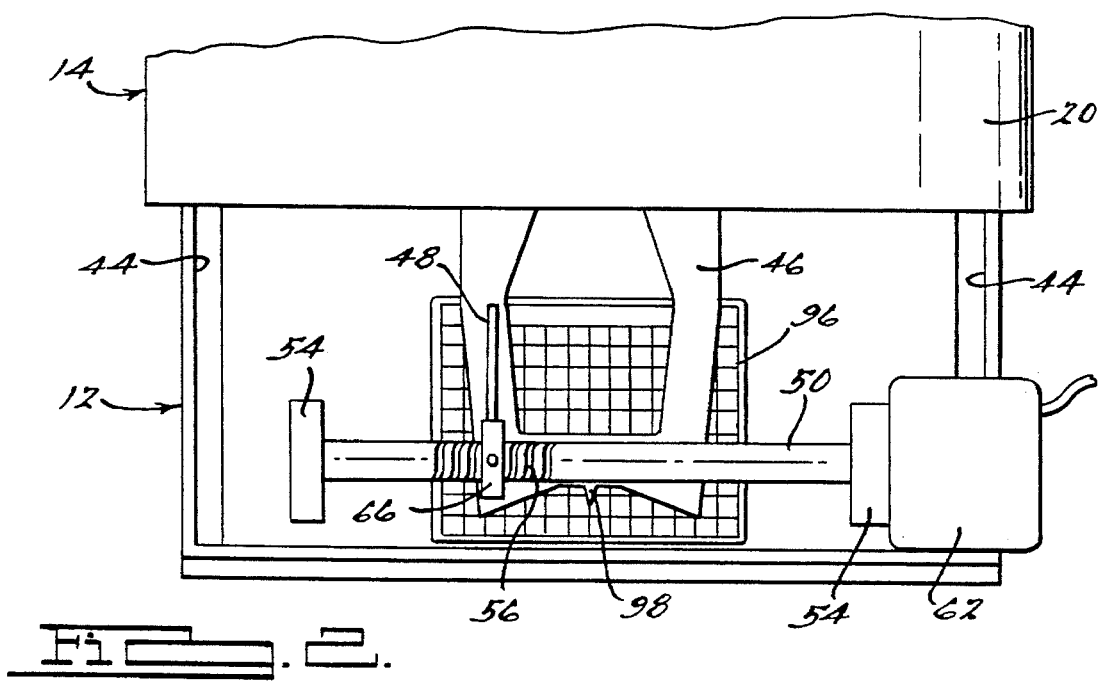
FIG. 2 is a partial top plan view of the visual projector of FIG. 1.
Figure 3:
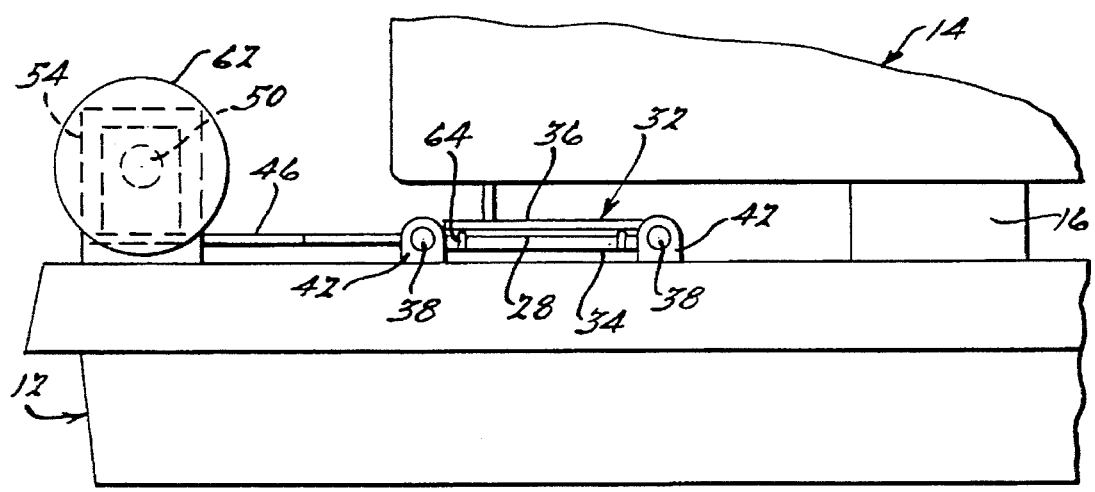
FIG. 3 is a partial side elevation of the visual projector of FIG. 1.

With reference to the drawings, FIGS. 1 through 3 show a visual projector 10 incorporating the novel stop-motion mechanism of the prevent invention. A visual projector 10 is shown having a box-shaped base assembly 12 and an upper housing assembly 14 which is supported on and above the base assembly 12 by a central pillar 16. The housing assembly 14 includes a viewing screen 18, a shroud 20, a housing 22, and preferably a focus adjustment knob 24. Images are projected upon the viewing screen 18 by projecting apparatus which includes a lamp 26 or other light source for illuminating a transparent film 28 or microfiche having a series of images thereon, and various mirrors 30 and lenses (not shown) for manipulating and internally projecting a representation of an image onto the viewing screen 18, so that an operator may view the representation of that image.

The optical arrangement of the visual projector 10 enables any region of the film to be viewed, but only one size portion of the film may be projected at a time. In other words, the projector 10 is generally capable of projecting a representation of a portion of the film 28 which is preferably the same size as one frame on the film 28. If desired, this amount of magnification may be changed by the operator by physically removing and replacing the lens.

Because only a portion of the film 28 can be viewed at any one time, the film 28 must be mounted for movement relative to the projecting apparatus, so that the operator may view the desired portion of the film 28. A carrier 32 is provided for holding the film 28 which is constructed of a movable, clear transparent platen 34 and a clear transparent hinged cover 36 which allows access to the platen 34 for inserting and removing various pieces of film 28. When the cover 36 is in a closed position, the film 28 is held in a stationary position with respect to the platen 34. The platen 34 and the cover 36 are mounted for horizontal movement with respect to the base assembly 12 by one or more horizontally extending guide rods 38. The platen 34 is mounted to the guide rods 38 by cylindrical sleeves 40 which surround and are adapted to slide laterally with respect to the guide rods 38. The lateral ends of the guide rods 38 are supported by bearings 42, which are in turn mounted within transversely extending channels 44, to allow the platen 34 to be moved in a transverse or fore and aft direction.

A manipulating arm 46 is rigidly affixed to one of the sleeves 40 for moving the platen 34 and the film 28 in any horizontal direction. The manipulating arm 46 may be moved manually in a fore and aft or transverse direction by the operator, and in a lateral direction by the stop-motion mechanism of the present invention.

The novel stop-motion mechanism of the present invention is adapted to move the manipulating arm 46, and consequently the film carrier 32, in an intermittent manner along a lateral or right and left direction. The movement of the stop-motion mechanism preferably causes the projector 10 to display the image on one frame for a period of time, then to move the film 28 to display another frame for a period of time, and so on. As a result, each frame may be centered, and the serial images imprinted on the frames will appear to be animated. This animation effect results from the optical principle of image holding, by which the human eye holds or retains any momentary image for a relatively short, but finite, period of time. Moreover, each frame may be imprinted with a serial number or other identifying information in a constant position in each frame, such as a page number, a date, or a patent number. This serial number or other information will appear to remain in a stationary position, and can be monitored until the desired serial number is reached and the projector shows a representation of the desired image. The present stop-motion mechanism is therefore much more desirable than the current movement mechanisms, which cause the film 28 to move quickly across the viewing screen 18, preventing the operator from seeing anything or discerning any usable information from the film as it is moving.

The novel stop-motion mechanism of the present invention comprises a laterally extending shaft 50 adapted to rotate about a longitudinal axis 52 which is mounted between bearings 54 which are affixed to the assembly 12. In contrast to known shafts having helical threads, the rotary shaft 50 of the present invention has an improved compound thread 56 inscribed about its surface. Generally, the thread 56 has an alternating series of helical portions 58 which define an acute angle with respect to the longitudinal axis 52 of rotation of the shaft 50 and arc portions 60 which describe an arc about the longitudinal axis 52 and define a right angle with respect to that axis 52. In other words, as the shaft 50 is rotated, the thread 56 describes a ramp-step function.

A motor 62 or other rotational means is affixed to the base assembly 12 for rotating the shaft 50 at any of a range of speeds selected by the operator, including a constant angular velocity. Index pins 64 may be provided on the platen 34 for orienting the film 28 so that the images are aligned with respect to the screen 18. A collar 66 is provided having an opening which surrounds a portion of the shaft 50 and preferably has at least two followers 68 disposed in diametrically opposite positions on the inner surface of the collar 66, for engaging and following the improved thread 56 formed on the rotatory shaft 50. The followers 68 are mounted for longitudinal motion with respect to the shaft 50. The bottom of the collar 66 is mounted on a transverse guideway 48 formed on the manipulating arm 46, to allow the arm 46 to be moved in a transverse fore and aft direction by an operator. This guideway 48 thus allows the collar 66 to translate transversely with respect to the manipulating arm 46, but prevents rotation of the collar 66 with respect to the arm 46 and thus to the assembly 12 of the projector 10. The followers 68 and the collar 66 thus engage the thread 56 on the rotary shaft 50 and move longitudinally in the desired intermittent stop-motion manner, when the motor 62 rotates the shaft 50. This intermittent motion is characterized by alternating periods in which the follower 68 moves longitudinally and in which the follower 68 remains stationary, when the follower 68 engages the helical portions 58 and the arc portions 60 respectively. The present stop-motion mechanism will cause this desirable intermittent motion when the shaft 50 is rotated at any constant angular velocity, and also at any smoothly changing velocity.

Figures 4, 5:
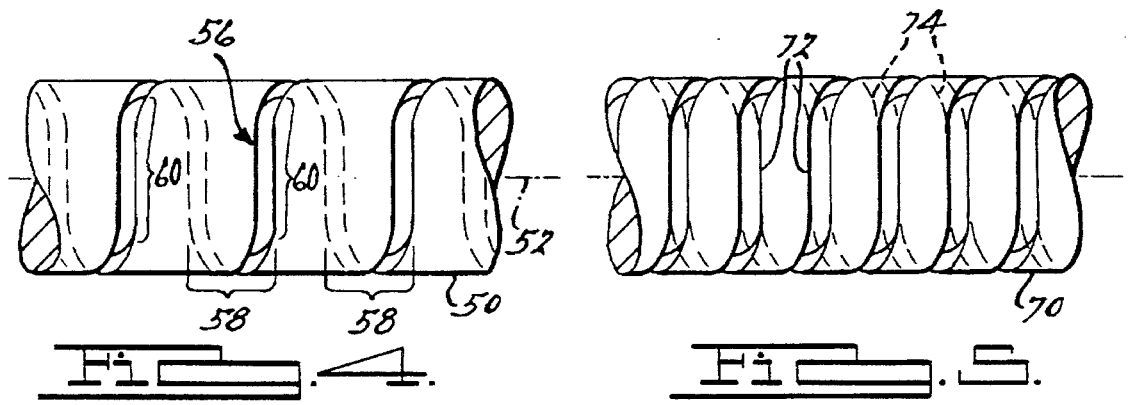
FIG. 4 is a partial side elevation of a threaded shaft according to the principles of the present invention.
FIG. 5 is a side elevational view of a threaded shaft according to an alternative embodiment of the present invention.

The unique threaded shaft 50 of the present invention is shown in greater detail in FIG. 4. The thread 56 is cut into the shaft 50 by a tool (not shown) which is advanced in a longitudinal direction along the shaft 50 in exactly the same intermittent, stop-motion manner in which it is desired to move the follower 68 and the platen 34, as the shaft 50 is rotated at a constant angular velocity. The resulting thread 56 has the desired alternating series of helical portions 58 and arc portions 60, and should preferably smoothly transition from one portion to the next.

An alternative embodiment of the present invention is shown in FIG. 5, in which the threaded shaft 70 has a first thread 72 which is formed substantially similar to that of the threaded shaft 50 depicted in FIG. 4, as well as a substantially similar second thread 74. The second thread 74 is disposed on the shaft 70 at an angular position which is rotated 180° around the longitudinal axis of the shaft 70. A collar 66 can thus be formed having more than one follower 68 or internal finger. At least a pair of diametrically opposed followers 68 is preferable so that the collar 66 will tend to follow the threads 72 and 74 smoothly and will tend not to seize and catch on the shaft 70.

Figure 7:
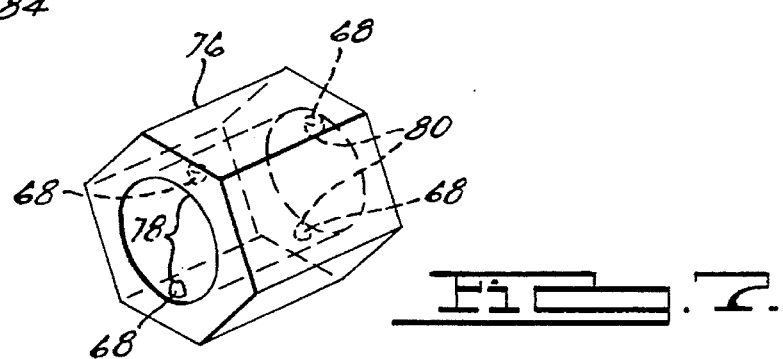
FIG. 7 is a perspective view of a collar having a follower according to the present invention.

A collar 76 having an alternative configuration is shown in FIG. 7. The collar 76 is longer in a longitudinal direction than the collar 66 shown in FIG. 2, and has a first pair 78 of followers 68 which are longitudinally spaced from a second pair 80 of followers 68. All of the followers 68 are preferably adapted to engage a first and second thread 72 and 74 on the shaft 70, as shown in FIG. 5. The first pair 78 of followers 68 thus engages both of the threads 72 and 74, and the second pair 80 of followers 68 also engage both of the threads 72 and 74 on the same shaft 70. The second pair 80 of followers 68 are displaced from the first pair 78 of followers 68 by a longitudinal distance equal to a multiple of one period of the threads 72 and 74 formed on the shaft 70.

Figure 6:
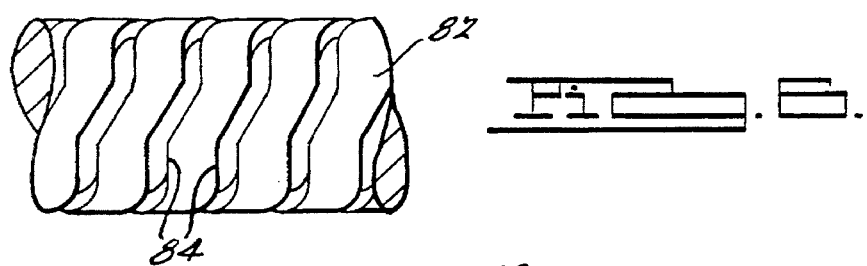
FIG. 6 is a partial side elevational view of a threaded shaft according to a second alternative embodiment of the shaft according to a second alternative embodiment of the present invention.

Another alternative embodiment of the present invention is depicted in FIG. 6, in which a shaft 82 is provided with an improved thread 84 according to the present invention is provided having several pairs of helical portions 58 and arc portions 60 per revolution of the shaft 82. When the shaft 82 is rotated, the follower 68 will thus advance and pause several times during each rotation of the shaft 82. The stop-motion mechanism of the present invention may be practiced with a wide numerical range of helical and arc portion pairs 60, or advances and pauses, per revolution of the shaft 80. Moreover, the thread may be provided with less than one helical portion 58 and arc portion 60. This flexibility allows a manufacturer to customize the stop-motion mechanism to fit various applications, including different types of film 28 having frames of different sizes. In addition, a visual projector may be adapted to allow various different threaded shafts to be installed. The number of pairs of helical portions 58 and arc portions 60 can also be preselected to fit a particular type of motor 62 having a certain operational speed or range of speeds.

Figure 8:
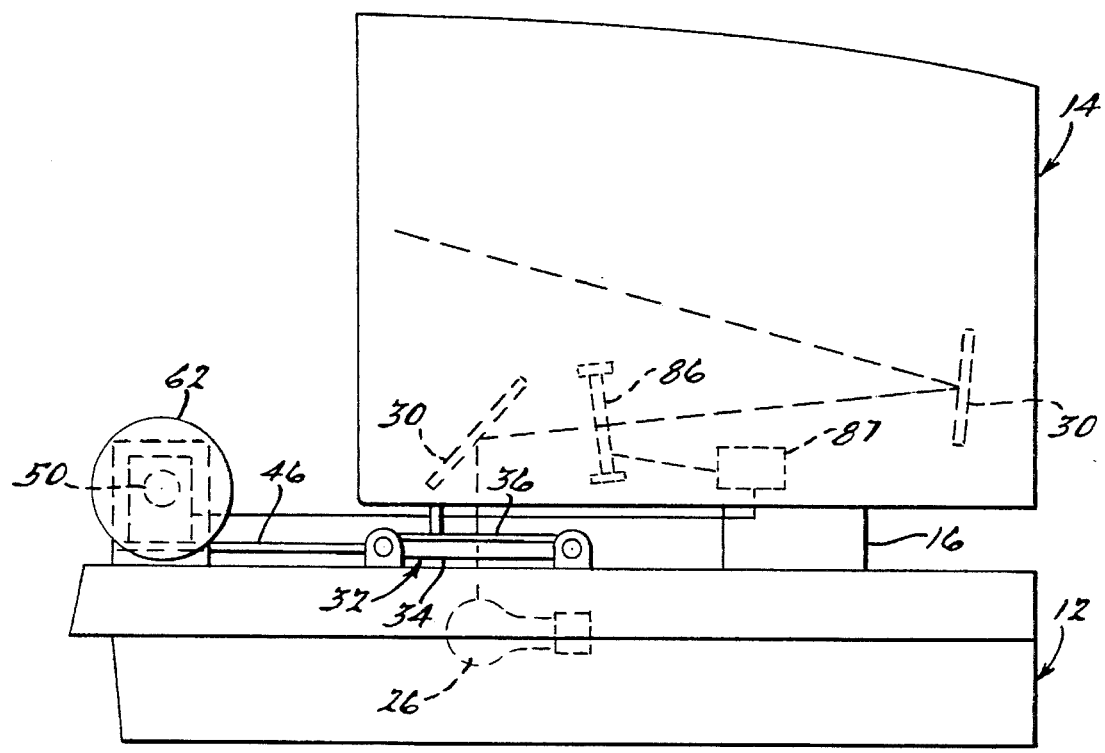
FIG. 8 is a side elevational view of a visual projector according to a third alternative embodiment of the present invention.

In addition, the visual projector incorporating the stop-motion mechanism of the present invention may be equipped with a shutter 86, as illustrated in diagrammatic form in FIG. 8. The shutter 86 should be linked to the follower 68 by control means 87, so that the shutter 86 opens to allow the image on the film 28 to be projected when the platen 34 is stationary, and the shutter 86 closes to block the lamp 26 and show no image when the follower 68 is engaging a helical portion 58 of the thread 56 and is thus advancing. The shutter 86 causes the images on the film 28 to be more clearly viewed, even when the shaft 50 is rotating at a high speed and the platen 34 and film are moving very rapidly. The resulting composite image to the operator is thus much more clear, and the operator can more quickly locate the desired portion of the film 28, for example by monitoring the progress of a serial number as described above.

Figure 10:
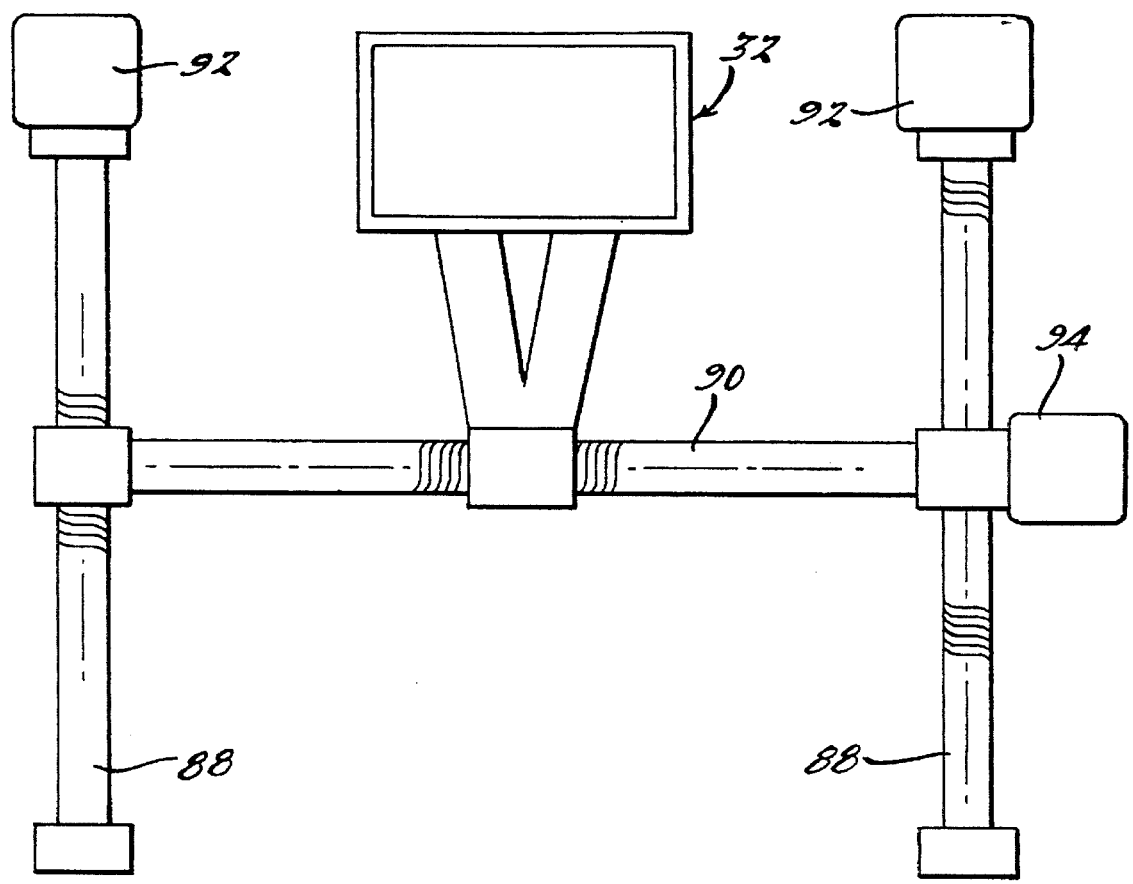
FIG. 10 is a diagrammatic view of a stop-motion mechanism according to yet another alternative embodiment of the present invention.

Further, the visual projector may be provided with a second stop-motion mechanism having a first and second rotatable shaft 88 and 90 which are mounted perpendicular to each other. The first and second shafts 88 and 90 are independently rotatable by a first and second motor 92 and 94 about a first and second axis which are perpendicular to each other. The shafts 88 and 90 are both formed with the improved thread 56 of the present invention. Such a composite stop-motion mechanism is disclosed in FIG. 10 and allows the operator to view a series of frames on the film 28 in the desired intermittent stop-motion manner, in two dimensions along orthogonal x and y axes.

The assembly 12 of the projector may be provided with an illustrative indexing guide 96 for providing a reference in relation to a pointer 98 on the manipulating arm 46 to inform an operator approximately which portion of the film 28 is being projected at a given time.

Figure 9:
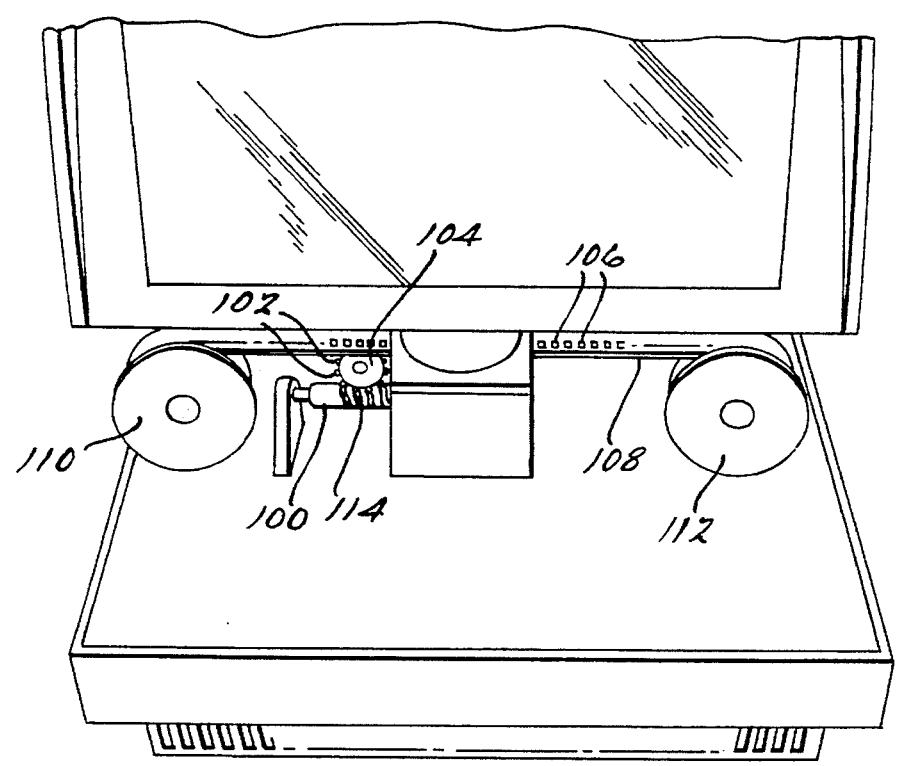
FIG. 9 is a partial perspective view of a visual projector according to another alternative embodiment of the present invention.

Yet another alternative embodiment of the present invention is shown in FIG. 9, in which a threaded shaft 100 is disposed for rotation about a longitudinal axis and a plurality of teeth or followers 102 are disposed about a disk or gear 104, forming a worm gear arrangement. The gear 104 is mounted for rotation about an axis which is perpendicular to the longitudinal axis of the shaft 100. As the shaft 100 is rotated at an angular velocity, the followers 102 move in a direction having a longitudinal component, and the gear 104 rotates in the desired intermittent, stop-motion manner. The gear 104 is adapted to engage indexing holes 106 disposed along a longitudinal edge of a strip of film 108 extending between a first and second reel 110 and 112. A reel-to-reel microfilm 108 may thus be viewed in a frame by frame manner, as opposed to one continuous motion which would create a blurred image. The reels 110 and 112 are preferably equipped with tensioning devices (not shown) for taking up any slack in the film 108, as the film 108 moves in either direction. Because the gear 104 does not translate, the thread 114 provided on the shaft 100 may be relatively short, because the followers 102 always engage the shaft 100 within a limited longitudinal range of positions. The pitch angle of the helical portions on the shaft must be relatively small, to allow the followers on the gear to follow the alternating shape of the thread.

It should be appreciated that the present invention has been described in relation to an exemplary embodiment of a visual projector, but that the present invention may also be utilized in numerous other applications. The present invention of a stop-motion mechanism may be employed in any situation where it is desirable to provide a mechanism which can receive a constant speed input and produce an intermittent stop-motion output. In other words, the present invention is not limited to visual projectors but rather may be utilized in various applications, including the automotive and transportation industries, other optical devices, assembly processes, and dispensing apparatus.

It should be understood that the preferred embodiment of the present invention have been shown and described herein, and that various modifications of the preferred embodiment will become apparent to those skilled in the art after a study of the specification, drawings, and following claims.

What is claimed is:

1. A stop-motion mechanism, comprising:
   a shaft having a thread and being rotatable about a longitudinal axis, said thread describing a curve on a cylindrical surface of said shaft having an alternating series of helical portions defining an acute angle with respect to said longitudinal axis and arc portions describing an arc about said longitudinal axis and defining a right angle thereto;
   rotational means for rotating said shaft; and
   a follower mounted for motion having a longitudinal component adapted to engage said thread;

wherein, when said shaft is rotated, said follower moves in an intermittent manner characterized by alternating periods in which said follower moves in a direction having a longitudinal component and in which said follower remains stationary, when said follower engages said helical portions and said arc portions respectively.

2. The stop-motion mechanism as claimed in claim 1, wherein said follower and a plurality of like followers are arranged on a gear having an axis of rotation which is mounted perpendicular to said longitudinal axis of said shaft, wherein said gear rotates in an intermittent manner when said shaft is rotated.

3. The stop-motion mechanism as claimed in claim 1, wherein said rotational means is adapted to rotate said shaft at a constant angular velocity.

4. The stop-motion mechanism as claimed in claim 1, further comprising a second rotatable shaft mounted perpendicular to said first shaft and coupled with said first follower to move in said intermittent manner, and a second follower for engaging a second thread on said second shaft, said second thread being formed substantially similar to said first thread, wherein said shafts are adapted to be rotated independently, such that said second follower may be selectively moved in said intermittent fashion in two dimensions.

5. The stop-motion mechanism as claimed in claim 1, further comprising a second thread formed similar to said first thread and a second follower for engaging said second thread, said first and second followers being coupled.

6. The stop-motion mechanism as claimed in claim 1, further comprising a collar having an opening surrounding said shaft, wherein said follower is affixed to and extends from an inner surface of said opening, said collar being mounted with respect to said shaft for longitudinal motion without rotation.

7. The stop-motion mechanism as claimed in claim 1, wherein said thread has more than one of said helical portions and said arc portions per revolution of said shaft.

8. The stop-motion mechanism as claimed in claim 1, wherein said thread has less than one of said helical portions and said arc portions per revolution of said shaft.

9. A visual projector having a stop-motion mechanism, comprising:
a carrier for movably holding a transparent film having a series of visual images thereon which are arranged in a series of frames;
a light source for illuminating said film and projecting a representation of said images onto a screen;
a shaft having a thread and being rotatable about a longitudinal axis, said thread describing a curve on a cylindrical surface of said shaft having an alternating series of arc portions describing an arc about said longitudinal axis and helical portions;
rotational means for rotating said shaft;
a follower mounted for motion having a longitudinal component adapted to engage said thread, said follower being coupled with said carrier;

wherein, when said shaft is rotated, said follower moves said carrier in an intermittent manner characterized by alternating periods in which said carrier moves in a direction having a longitudinal component and in which said carrier remains stationary, whereby said images may be projected sequentially during said stationary periods for more clearly viewing a series of said images.

10. The visual projector as claimed in claim 9, further comprising a shutter for blocking said light source and preventing said images from being projected during said stationary periods.

11. The visual projector as claimed in claim 9, further comprising indexing means for orienting said film with respect to said carrier so that said images are successively aligned with respect to said screen during said stationary periods.

12. The visual projector as claimed in claim 9, wherein said carrier is formed as a reel for holding a rolled strip of film.

13. The visual projector as claimed in claim 9, wherein said film is formed as microfiche or microfilm.

14. The visual projector as claimed in claim 9, wherein said follower and a plurality of like followers are arranged on a gear having an axis of rotation which is mounted perpendicular to said longitudinal axis of said shaft, wherein said gear rotates in an intermittent manner when said shaft is rotated.

15. The visual projector as claimed in claim 9, wherein said rotational means is adapted to rotate said shaft at a constant angular velocity.

16. The visual projector as claimed in claim 9, further comprising a second rotatable shaft mounted perpendicular to said first shaft and coupled with said first follower to move in said intermittent manner, and a second follower for engaging a second thread on said second shaft, said second thread being formed substantially similar to said first thread, wherein said shafts are adapted to be rotated independently, such that said second follower may be selectively moved in said intermittent fashion in two dimensions.

17. The visual projector as claimed in claim 9, further comprising a second thread formed similar to said first thread and a second follower for engaging said second thread, said first and second followers being coupled.

18. The visual projector as claimed in claim 9, further comprising a collar having an opening surrounding said shaft, wherein said follower is affixed to and extends from an inner surface of said opening, said collar being mounted with respect to said shaft for longitudinal motion without rotation.

19. The visual projector as claimed in claim 9, wherein said thread has more than one of said helical portions and said arc portions per revolution of said shaft.

20. The visual projector as claimed in claim 9, wherein said thread has less than one of said helical portions and said arc portions per revolution of said shaft.

* * * * *